United States Patent
Li et al.

(10) Patent No.: US 10,856,292 B2
(45) Date of Patent: Dec. 1, 2020

(54) COMMUNICATION METHOD AND BASE STATION

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 55 days.

(21) Appl. No.: 16/320,652

(22) PCT Filed: Nov. 30, 2016

(86) PCT No.: PCT/CN2016/107915
§ 371 (c)(1),
(2) Date: Jan. 25, 2019

(87) PCT Pub. No.: WO2018/018817
PCT Pub. Date: Feb. 1, 2018

(65) Prior Publication Data
US 2019/0182833 A1   Jun. 13, 2019

(30) Foreign Application Priority Data

Jul. 29, 2016 (CN) .......................... 2016 1 0619715

(51) Int. Cl.
*H04W 72/04* (2009.01)
*H04L 1/18* (2006.01)
*H04W 72/12* (2009.01)

(52) U.S. Cl.
CPC ....... *H04W 72/0446* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2015/0030090 A1* 1/2015 You ........................... H04L 5/16
375/260
2015/0103702 A1 4/2015 Lahetkangas et al.
(Continued)

FOREIGN PATENT DOCUMENTS

CN   102695276 A   9/2012
CN   102905373 A   1/2013

*Primary Examiner* — Jason E Mattis
*Assistant Examiner* — Hong Shao
(74) *Attorney, Agent, or Firm* — ScienBiziP, P.C.

(57) ABSTRACT

A communication method and a base station are provided, the method includes: determining, by a base station, a time length of a time domain scheduling unit, a downlink, a guard period and symbols occupied by an uplink, included in the time domain scheduling unit; generating length configuration information of the time domain scheduling unit according to the time length, the downlink, the guard period and the symbols occupied by the uplink; sending the length configuration information to a terminal through radio resource control signaling and/or downlink control information signaling, and informing the terminal of a length configuration of the time domain scheduling unit; implementing, by the base station, a communication with the terminal based on the length configuration. By utilizing the method, it is beneficial for the terminal to acquire time information of time domain resource scheduling, and utilization efficiency of time domain resources is improved.

20 Claims, 8 Drawing Sheets

(52) U.S. Cl.
CPC ......... *H04L 1/1887* (2013.01); *H04W 72/042* (2013.01); *H04W 72/1289* (2013.01); *H04W 72/1273* (2013.01)

(56) References Cited

U.S. PATENT DOCUMENTS

2018/0132132 A1\* 5/2018 Pan ..................... H04W 28/06
2019/0159178 A1\* 5/2019 Tang ................... H04L 27/2602

\* cited by examiner

COMMUNICATION METHOD AND BASE STATION

CROSS-REFERENCE TO RELATED APPLICATIONS

The application claims priority of Chinese Patent Application No. 201610619715.4, entitled "communication method and base station," filed on Jul. 29, 2016 in the China National Intellectual Property Administration (CNIPA), the entire contents of which are incorporated by reference herein.

FIELD

The embodiments of the present disclosure relates to technical fields of communications, specifically a communication method and a base station.

BACKGROUND

With a rapid improvement of communication requirements of users, communication traffic is in explosive growth, resource scheduling granularities and processing time delay of the Long Term Evolution (LTE) and Long Term Evolution-Advanced (LTE-A) cannot fully meet requirements of the users. Specifically, in the existing 4G and 4.5G mobile communication technologies, both of them are implemented based on a time domain scheduling unit (i.e., the minimum resource granularity of time domain scheduling supported by the system) in the LTE and LTE-A wireless access technology and a frame structure. A size of the time domain scheduling unit is generally fixed, and the frame structure is also fixed. For diversified requirements of 5G services in the future, very flexible resource scheduling and less processing time delay are expected to be obtained, however, if a current fixed frame structure and a fixed resource granularity of the time domain are used, greater scheduling time delay (i.e., larger than or equal to 4 ms) and longer feedback time delay (i.e., larger than or equal to 4 ms) of Hybrid Auto Repeat Request (HARQ) and the like cannot be realized.

Therefore, a new time domain scheduling unit needs to be configured to flexibly schedule time domain resources and reduce time delay; and meanwhile, configuration information of the time domain scheduling unit needs to be sent to a terminal, thereby implementing a communication with the terminal.

SUMMARY

In order to solve the above-described technical problem, a first aspect of an embodiment of the present disclosure provides a communication method, including:

determining, by a base station, a time length of a time domain scheduling unit, a downlink, a guard period and symbols occupied by an uplink, included in the time domain scheduling unit;

generating length configuration information of the time domain scheduling unit according to the time length of the time domain scheduling unit, the downlink, the guard period and the symbols occupied by the uplink, included in the time domain scheduling unit;

sending the length configuration information to a terminal through radio resource control signaling and/or downlink control information signaling, and informing the terminal of a length configuration of the time domain scheduling unit;

implementing, by the base station, a communication with the terminal based on the length configuration of the time domain scheduling unit, after the terminal acquires the length configuration of the time domain scheduling unit.

Sending the length configuration information to the terminal through the radio resource control signaling and/or the downlink control information signaling, and informing the terminal of the length configuration of the time domain scheduling unit, includes:

Sending the radio resource control signaling to the terminal;

Configuring and carrying the time length information of the time domain scheduling unit, symbol information occupied by the downlink, symbol information occupied by the guard period, symbol information occupied by the uplink and sequence information of the downlink, the guard period and the uplink, in the radio resource control signaling.

Sending the length configuration information to the terminal through the radio resource control signaling and/or the downlink control information signaling, and informing the terminal of the length configuration of the time domain scheduling unit, includes:

Sending the radio resource control signaling to the terminal;

Under the condition that the time domain scheduling unit is used for transmitting downlink data, configuring and carrying indication signaling for the time domain scheduling unit to transmit the downlink data, the time length information of the time domain scheduling unit, the symbol information occupied by the guard period, the symbol information occupied by the uplink and sequence information of the downlink, the guard period and the uplink, in the radio resource control signaling;

Under the condition that the time domain scheduling unit is used for transmitting uplink data, configuring and carrying indication signaling for the time domain scheduling unit to transmit the uplink data, the time length information of the time domain scheduling unit, the symbol information occupied by the downlink, the symbol information occupied by the guard period, and the sequence information of the downlink, the guard period and the uplink, in the radio resource control signaling.

Sending the length configuration information to the terminal through the radio resource control signaling and the downlink control information signaling, and informing the terminal of the length configuration of the time domain scheduling unit, includes:

Numbering each type of length configuration in the length configuration information;

Sending the length configuration information and a serial number corresponding to each type of length configuration to the terminal through the radio resource control signaling;

Sending a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

Sending the length configuration information to the terminal through the downlink control information signaling, and informing the terminal of the length configuration of the time domain scheduling unit, includes:

Numbering each type of length configuration in the length configuration information;

Sending a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

Under the condition that the time domain scheduling unit is used for transmitting downlink data, indicating in the downlink control information signaling, a serial number offset value x of the time domain scheduling unit where the downlink data resides, corresponding to a hybrid automatic repeat request (HARQ) feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;

Under the condition that the time domain scheduling unit is used for transmitting the uplink data, indicating in the downlink control information signaling, a serial number offset value y of the time domain scheduling unit that sends the uplink data, which corresponds to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

A second aspect of the embodiment of the present disclosure provides a base station, which includes:

A determination unit, configured to determine a time length of a time domain scheduling unit, a downlink, a guard period and symbols occupied by an uplink, included in the time domain scheduling unit;

A generation unit, configured to generate length configuration information of the time domain scheduling unit according to the determined time length of the time domain scheduling unit, the downlink, the guard period and the symbols occupied by the uplink, included in the time domain scheduling unit;

A sending unit, configured to send the length configuration information to a terminal through radio resource control signaling and/or downlink control information signaling, and inform the terminal of a length configuration of the time domain scheduling unit;

A communication unit, configured to implement a communication with the terminal by the base station based on the length configuration of the time domain scheduling unit, after the terminal acquires the length configuration of the time domain scheduling unit.

The sending unit is specifically configured to:
Send the radio resource control signaling to the terminal;
Configure and carry the time length information of the time domain scheduling unit, symbol information occupied by the downlink, symbol information occupied by the guard period, symbol information occupied by the uplink and sequence information of the downlink, the guard period and the uplink, in the radio resource control signaling.

The sending unit is specifically configured to:
Send the radio resource control signaling to the terminal;
Under the condition that the time domain scheduling unit is used for transmitting downlink data, configure and carry indication signaling for the time domain scheduling unit to transmit the downlink data, the time length information of the time domain scheduling unit, the symbol information occupied by the guard period, the symbol information occupied by the uplink and the sequence information of the downlink, the guard period and the uplink, in the radio resource control signaling;

Under the condition that the time domain scheduling unit is used for transmitting uplink data, configure and carry indication signaling for the time domain scheduling unit to transmit the uplink data, the time length information of the time domain scheduling unit, the symbol information occupied by the downlink, the symbol information occupied by the guard period, and the sequence information of the downlink, the guard period and the uplink, in the radio resource control signaling.

The sending unit is specifically configured to:
Number each type of length configuration in the length configuration information;
Send the length configuration information and a serial number corresponding to each type of length configuration to the terminal through the radio resource control signaling;
Send a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

The sending unit is specifically configured to:
Number each type of length configuration in the length configuration information;
Send a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

The base station further includes:
An indication unit, configured to, under the condition that the time domain scheduling unit is used for transmitting downlink data, indicate in the downlink control information signaling, a serial number offset value x of the time domain scheduling unit where the downlink data resides, corresponding to a HARQ feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;

Under the condition that the time domain scheduling unit is used for transmitting the uplink data, indicate in the downlink control information signaling, a serial number offset value y of the time domain scheduling unit that sends the uplink data, corresponding to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

BRIEF DESCRIPTION OF THE DRAWINGS

To describe the technical solutions in embodiments of the present disclosure or in the prior art more clearly, the following briefly introduces the accompanying drawings needed for describing the embodiments. Apparently, the accompanying drawings in the following description show merely some embodiments of the present disclosure, and persons of ordinary skill in the art may still derive other drawings from these accompanying drawings without creative efforts

DETAILED DESCRIPTION

Figure 1:
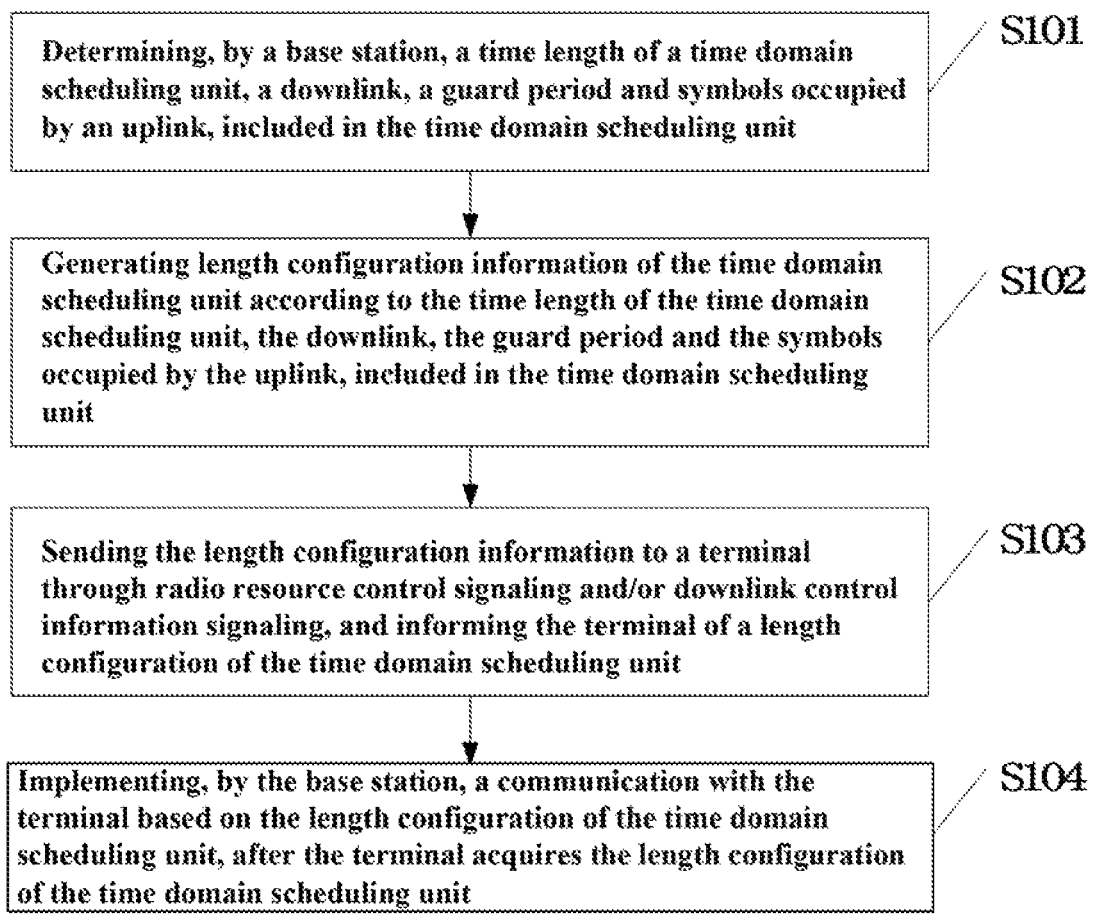
FIG. 1 is a flowchart of a first embodiment of a communication method in accordance with the present disclosure.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Main scenes of future 5G communication include the following three types of Enhanced Mobile Broadband (eMBB), Massive Machine Type Communications (Mmtc) and a Ultra Reliable Low Latency Communications (URLLC). The service types of the three scenes are different, and the requirements of the three scenes are also different.

For example, for an eMBB service, two main indicators are high bandwidth and low latency (that is required to be 4 ms). In future high-frequency communications, a large bandwidth of 100 mhz may be supported, and the whole bandwidth can be directly assigned to a user at a certain moment. Uplink scheduling time delay and HARQ feedback time delay also can cause time delay influence.

For a mMTC service, a narrow-band service and a long-life battery are needed, frequency domain resource with a smaller granularity and time domain resource with a wider granularity are required for the service.

For a URLLC service, time delay is required to be 0.5 ms. A time domain scheduling granularity, and time delay caused by uplink scheduling time delay and HARQ feedback time delay, are also need to be reduced.

Therefore, a new time domain scheduling unit is needed to be configured, thereby improving the flexibility of time domain resource scheduling is improved, and reducing system processing time delay.

In an embodiment of the present disclosure, a communication system can include a base station and a terminal.

User equipment in the embodiments of the present disclosure can also be referred to as a terminal, which can include an smart phone (such as an ANDROID™ mobile phone, an IOS™ mobile phone, a WINDOWS™ phone etc.), a tablet computer, a palm computer, a notebook computer, a Mobile Internet Device (MID) or wearable equipment etc., and the above-described user equipment is merely an example, but is not limited to the above-described user equipment.

The base station in the embodiments of the present disclosure can configure a time length of the time domain scheduling unit and a specific structure of the time domain scheduling unit according to services implemented between the base station and the terminal, the specific structure includes specific components and a specific length of each of the specific components, namely a number of subframes and/or symbols that are occupied. The base station sends configuration information related to the time domain scheduling unit, to the terminal through the signaling. The following is illustrated in detail in combination with FIG. 1 to FIG. 4.

Refer to FIG. 1, which is a flowchart of a first embodiment of a communication method in accordance with the present disclosure. In the first embodiment, the communication method includes the following steps:

S101, a base station determines a time length of a time domain scheduling unit, and a downlink, a guard period and symbols occupied by an uplink, included in the time domain scheduling unit.

The time domain scheduling unit specifically includes the downlink, the guard period and the uplink, the time length of the time domain scheduling unit is $2^n*5^m$ ms, and m and n are integers.

That is, in the smallest time domain scheduling granularity of a system, a downlink (DL), a guard period (GP) and an uplink (UL) can be included. The DL, GP and UL can be sequentially arranged in a time domain scheduling unit. Definitely, according to different requirements of service transmission information, an arrangement sequence can also be sequences of GP-UL-DL or UL-DL-GP except a sequence of DL-GP-UL as described in this embodiment, the embodiments of the present disclosure are not limited in any way. In order to facilitate description, the sequence of DL-GP-UL is introduced following.

In addition, it should be noted that m and n can be positive integers or negative integers, and can also be 0. Optionally, the base station can determine to use time domain scheduling units with different time lengths for different services. For example, for a service A, m may be determined to be 0, and n may be equal to −3, −2, −1, also can be equal to 1, 2, 3, and can also be equal to 0. Thus, the time length of the time domain scheduling unit can be 0.125 ms, 0.25 ms, 0.5 ms, 2 ms, 4 ms, 8 ms or 1 ms in sequence. For a service B, n is determined to be 0, and m can be equal to −3, −2 and −1, also can be equal to 1, 2 and 3, and also can be equal to 0. Thus, the time length of the time domain scheduling unit is 0.008 ms, 0.04 ms, 0.2 ms, 5 ms, 25 ms, 125 ms or 1 ms sequentially. For another service, such as a service C, m and n may not be 0, for example, m is −1, n is 2, and the time length of the time domain scheduling unit is 0.8 ms. According to different service requirements, the base station can adaptively adjust values of m and n to adapt to the service requirements, the embodiments of the present disclosure are not limited in any way.

Optionally, a specific time length of the time domain scheduling unit and specific lengths of three parts (e.g., the DL, the GP and the UL) included in the time domain scheduling unit can be configured according to information to be transmitted by the service.

Under the condition that the base station needs to send data to the terminal when an existing service is implementing, the time domain scheduling unit mainly transmits downlink information; and under the condition that the terminal needs to send data to the base station when the existing service is implementing, the time domain scheduling unit mainly transmits uplink information. Definitely, the downlink information and the uplink information can also be transmitted in a time domain scheduling unit at the same time.

For example, when the DL is mainly used, namely when information transmitted by the time domain scheduling unit includes downlink data, a number of symbols occupied by the DL is larger than a number of symbols occupied by the UL. The DL includes the downlink data, and the number of the symbols occupied by the UL is small, and the UL mainly include Sounding Reference Signal (SRS) and/or Uplink Control Information (UCI) and/or a random access preamble, and 1 to 2 symbols are occupied by the GP.

When the UL is mainly used, namely when information transmitted by the time domain scheduling unit includes uplink data, the number of the symbols occupied by the UL is larger than the number of the symbols occupied by the DL. The DL mainly includes Downlink Control Information (DCI) or a reference signal, the UL includes a larger number of the symbols and includes the uplink data or random access preamble (RA preamble), and 1 to 2 symbols are occupied by the GP.

More specifically, under the condition that the time domain scheduling unit merely includes one subframe, the subframe includes 14 symbols, according to the sequence of the downlink, the guard period and the uplink, the symbols which are occupied by the DL, the GP and the UL are set in sequence.

Symbols in a subframe are continuous, and symbols occupied by the downlink, the guard period and the uplink also are continuous in sequence and are arranged in a specific sequence. Since the time length of the subframe is adjustable, a length of each of the symbols is determined according to a length of the subframe, and can be obtained through calculation of $2^n*5^m/14$.

When the information transmitted by the time domain scheduling unit merely includes the uplink information, the number of the symbols occupied by the downlink is set to be zero, the number of the symbols occupied by the guard period is set to be zero, and the number of the symbols occupied by the uplink is set to be 14. Optionally, all of the UL can be used for transmitting the uplink information, or a small period of time at a head part or a tail part of the UL is used for implementing a Listening Before Talk (LBT) detection.

When the information transmitted by the time domain scheduling unit includes Downlink Control Information (DCI) and/or downlink reference information of a Physical Downlink Control Channel (PDCCH), and uplink data and/or Uplink Control Information (UCI) and/or a Sounding Reference Signal (SRS) and/or a Random Access Preamble (RA preamble), the number of the symbols occupied by the downlink is set to be 1 or 2 or 3, the number of the symbols occupied by the guard period is 1 or 2, and other symbols are set to be the length of the uplink. It should be noted that the DCI here mainly includes uplink resource scheduling signaling. The downlink reference signal may include a Common Reference Signal (CRS), a Channel Status Information Reference Signal (CSI-RS), a Demodulation Reference Signal (DM-RS), a Discovery Reference Signal (DRS) or one or more of new reference signals in a new wireless technology. The uplink control information can be Channel Quality Indicator (CQI) feedback and/or a HARQ feedback.

When the information transmitted by the time domain scheduling unit includes DCI of the PDCCH and/or downlink data of a Physical Downlink Shared Channel (PDSCH) and/or Downlink Reference Information (DRI), and the uplink data and/or the UCI and/or the SRS and/or the RA preamble, the number of the symbols occupied by the downlink is set to be larger than or equal to 3 and less than or equal to 11, the number of the symbols occupied by the guard period is set to be 1 or 2, and the other symbols are set to be the length of the uplink; or the number of the symbols occupied by the downlink is set to be 12, the number of the symbols occupied by the guard period is set to be 1, and the other symbols are set to be the length of the uplink. It should be noted that the DCI here mainly includes downlink resource scheduling signaling, or mainly includes the downlink resource scheduling signaling and uplink resource scheduling signaling. Optionally, when the number of the symbols occupied by the downlink is 3, 6, 9, 10, 11 and 12, a structure of downlink data transmission of LTE can be multiplexed. The DRS may include a CRS, a CSI-RS, a DM-RS, a DRS, or one or more of new reference signals in a new wireless technology. The UCI can be a CQI feedback and/or a HARQ feedback.

When the information transmitted by the time domain scheduling unit includes DCI of an enhanced Physical Downlink Control Channel (ePDCCH) and/or downlink data and/or DRI of a PDSCH, and uplink data and/or the UCI and/or the SRS and/or the RA preamble, the number of the symbols occupied by the downlink is set to be 7, the number of the symbols occupied by the guard period is set to be 1 or 2, and the other symbols are set to be the length of the uplink.

When the information transmitted by the time domain scheduling unit merely includes the downlink information, the number of the symbols occupied by the downlink is set to be 14, the number of the symbols occupied by the guard period is set to be zero, and the number of the symbols occupied by the uplink is set to be zero. Optionally, all of the DL can be used for transmitting the downlink information, or a small period of time at the head part or the tail part of the DL is used for implementing the LBT detection.

Optionally, the DL may be 0, 1, 2, 3, 6, 9, 10, 11, 12 and 14 (when the number of the symbols of the DL is 3, 6, 9, 10, 11, 12 and 14, the structure of the DL data transmission of LTE can be multiplexed) as described above, in addition, the length of the DL can also be a length of 4 or 5 or 7 or 8 or 13 symbols. When the DL occupies 4 or 5 or 7 or 8 or 13 symbols, the DL can be used for sending the DCI of the PDCCH and/or the downlink data of the PDSCH and/or downlink reference signal (i.e., CRS, CSI-RS, DM-RS, DRS or one or more of the new reference signals in the new wireless technology).

Under the condition that the time domain scheduling unit includes m subframes, m is an integer larger than or equal to 2, and each subframe includes 14 symbols; according to the sequence of the downlink, the guard period and the uplink the symbols occupied by the downlink, the guard period and the uplink are set in sequence.

The m subframes are continuous, the symbols in each subframe are also continuous, and the subframes or the symbols occupied by the downlink, the guard period and the uplink are sequentially and are arranged according to a specific sequence.

When the information transmitted by the time domain scheduling unit merely includes uplink information, the number of the symbols occupied by the downlink is set to be zero, the number of the symbols occupied by the guard period is set to be zero, and the length occupied by the uplink is m subframes.

When the information transmitted by the time domain scheduling unit includes DCI of the PDCCH and/or downlink reference information, and the uplink data and/or the UCI and/or the SRS and/or the RA preamble, a number of symbols of the first subframe occupied by the downlink is set to be 1 or 2 or 3, a number of symbols of a first subframe occupied by the guard period is set to be 1 or 2, and the other symbols of the first subframe and the other subframes except the first subframe are set to be the length of the uplink. It should be noted that the DCI here mainly includes uplink resource scheduling signaling. DRS may include CRS, CSI-RS, DM-RS, DRS or one or more of the new reference signals in the new wireless technology. The UCI can be the CQI feedback and/or the HARQ feedback.

When the information transmitted by the time domain scheduling unit includes DCI of the PDCCH or DCI of an enhanced PDCCH and/or downlink data of PDSCH and/or downlink reference information, and the uplink data and/or the UCI and/or the SRS and/or the RA preamble, the other subframes except the last subframe occupied by the downlink and a number of symbols of the last subframe are set to be larger than or equal to 3 and less than or equal to 11, a number of symbols of the last subframe occupied by the guard period is set to be 1 or 2, and the other symbols of the last subframe are set to be the length of the uplink, or the other subframes except the last subframe occupied by the downlink and the number of the symbols of the last subframe are set to be 12, the number of the symbols of the last subframe occupied by the guard period is set to be 1, and the other symbols of the last subframe are set to be the length of the uplink. It should be noted that the DCI here mainly includes downlink resource scheduling signaling, or mainly includes downlink resource scheduling signaling and uplink resource scheduling signaling. Optionally, when the number of the symbols occupied by the downlink is 3, 6, 9, 10, 11, 12, the structure of the downlink data transmission of LTE can be multiplexed. In addition, when the number of the symbols occupied is 14, the structure of the downlink data transmission of LTE can also be multiplexed. Downlink reference signal may include CRS, CSI-RS, DM-RS, DRS or one or more of the new reference signals in the new wireless technology. The UCI can be the CQI feedback and/or the HARQ feedback.

When the information transmitted by the time domain scheduling unit includes DCI of the enhanced PDCCH and/or downlink data of the PDSCH and/or downlink reference information, and the uplink data and/or the UCI and/or the SRS and/or the RA preamble, a number of symbols of a first subframe occupied by the downlink is set to be 7, a number of symbols of the first subframe occupied by the guard period is set to be 1 or 2, and the other symbols of the first subframe and the other subframes except the first subframe are set to be the length of the uplink link.

When the information transmitted by the time domain scheduling unit merely includes downlink information, a length occupied by the downlink is set to be M subframes, a number of symbols occupied by the guard period is set to be zero, and a number of symbols occupied by the uplink is set to be zero.

DCI of the first subframe of the time domain scheduling unit includes scheduling information for scheduling the whole time domain scheduling unit, and the time domain scheduling unit merely includes one conversion between the downlink and the uplink.

That is, when the time domain scheduling unit includes more than one subframe, all of the subframes included can be used as a whole for scheduling.

S102, generating length configuration information of the time domain scheduling unit according to the determined time length of the time domain scheduling unit, and the downlink, the guard period and the symbols occupied by the uplink, which are included in the time domain scheduling unit. In some embodiments, the time domain scheduling unit includes the downlink, the guard period and the symbols occupied by the uplink.

S103, sending the length configuration information to a terminal through Radio Resource Control (RRC) signaling and/or DCI signaling, and informing the terminal of a length configuration of the time domain scheduling unit.

S104: implementing a communication with the terminal by the base station based on the length configuration of the time domain scheduling unit, after the terminal acquires the length configuration of the time domain scheduling unit.

When the terminal acquires the length configuration, the terminal can know when to receive or send corresponding information or data, and successfully complete the communication with the base station.

In this embodiment, after the base station determines the time length of the time domain scheduling unit and the downlink, the guard period and the symbols occupied by the uplink included in the time domain scheduling unit, the base station can generate the length configuration information of the time domain scheduling unit; send the length configuration information to the terminal through the RRC signaling and/or the DCI signaling; and implement the communication with the terminal based on the length configuration of the time domain scheduling unit. Through the new time domain scheduling unit, flexible scheduling of time domain resources can be realized and the processing time delay of the system can be reduced.

In the following, selection of specific signaling is illustrated in detail in combination with FIG. 2 to FIG. 4.

Figure 2:
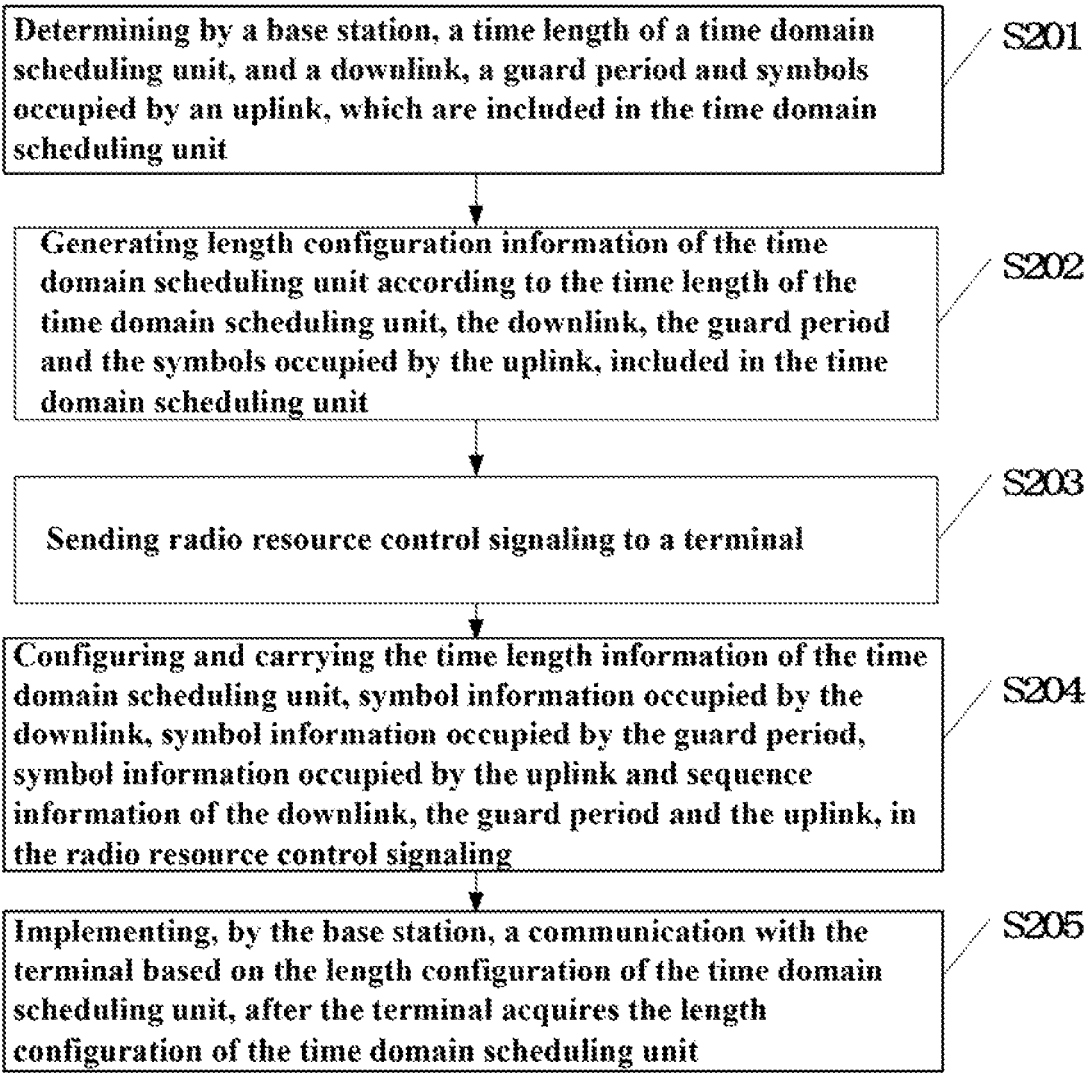
FIG. 2 is a flowchart of a second embodiment of the communication method in accordance with the present disclosure.

Referring to FIG. 2, which is a flowchart of a second embodiment of the communication method in accordance with the present disclosure. In the second embodiment, specific configuration information is directly informed to the terminal through the RRC signaling. The method includes the following steps:

S201, the base station determines a time length of a time domain scheduling unit, and a downlink, a guard period and symbols occupied by an uplink, which are included in the time domain scheduling unit.

S202, the base station generates length configuration information of the time domain scheduling unit according to the determined time length of the time domain scheduling unit, and the downlink, the guard period and the symbols occupied by the uplink, which are included in the time domain scheduling unit.

S203, the base station sends RRC signaling to the terminal.

S204, the base station configures and carries the time length information of the time domain scheduling unit, symbol information occupied by the downlink, symbol information occupied by the guard period, symbol information occupied by the uplink and sequence information of the downlink, the guard period and the uplink, in the RRC signaling.

S205, after the terminal acquires the length configuration of the time domain scheduling unit, the base station implements a communication with the terminal based on the length configuration of the time domain scheduling unit.

Figure 3:
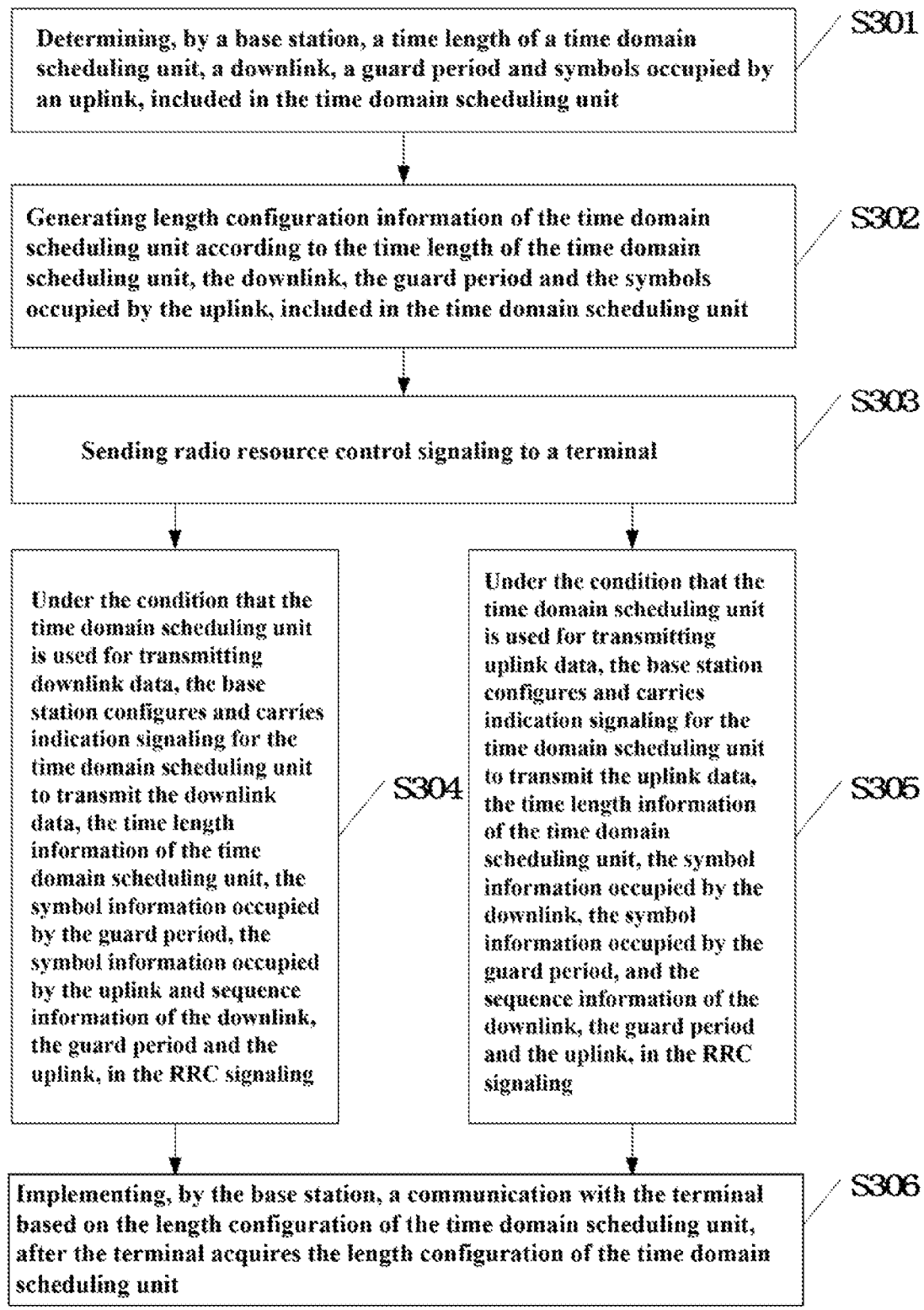
FIG. 3 is a flowchart of a third embodiment of the communication method in accordance with the present disclosure.

Referring to FIG. 3, which is a flowchart of a third embodiment of the communication method in accordance with the present disclosure. In the third embodiment, firstly, in the RRC signaling, it is indicated that the time domain scheduling unit is currently configured to transmit downlink data through a downlink mainly, or transmit uplink data through an uplink mainly; and then the specific configuration information is notified to the terminal through the RRC signaling. The method includes the following steps:

S301, the base station determines a time length of a time domain scheduling unit, and a downlink, a guard period and symbols occupied by an uplink, which are included in the time domain scheduling unit.

S302, the base station generates length configuration information of the time domain scheduling unit according to the determined time length of the time domain scheduling unit, and the downlink, the guard period and the symbols occupied by the uplink, which are included in the time domain scheduling unit.

S303, the base station sends RRC signaling to the terminal.

S304, under the condition that the time domain scheduling unit is used for transmitting downlink data, the base station configures and carries indication signaling for the time domain scheduling unit to transmit the downlink data, the time length information of the time domain scheduling unit, the symbol information occupied by the guard period, the symbol information occupied by the uplink and sequence information of the downlink, the guard period and the uplink, in the RRC signaling.

S305, under the condition that the time domain scheduling unit is used for transmitting uplink data, the base station configures and carries indication signaling for the time domain scheduling unit to transmit the uplink data, the time length information of the time domain scheduling unit, the symbol information occupied by the downlink, the symbol information occupied by the guard period, and the sequence information of the downlink, the guard period and the uplink, in the RRC signaling.

S306, after the terminal acquires the length configuration of the time domain scheduling unit, the base station implements a communication with the terminal based on the length configuration of the time domain scheduling unit.

Figure 4:
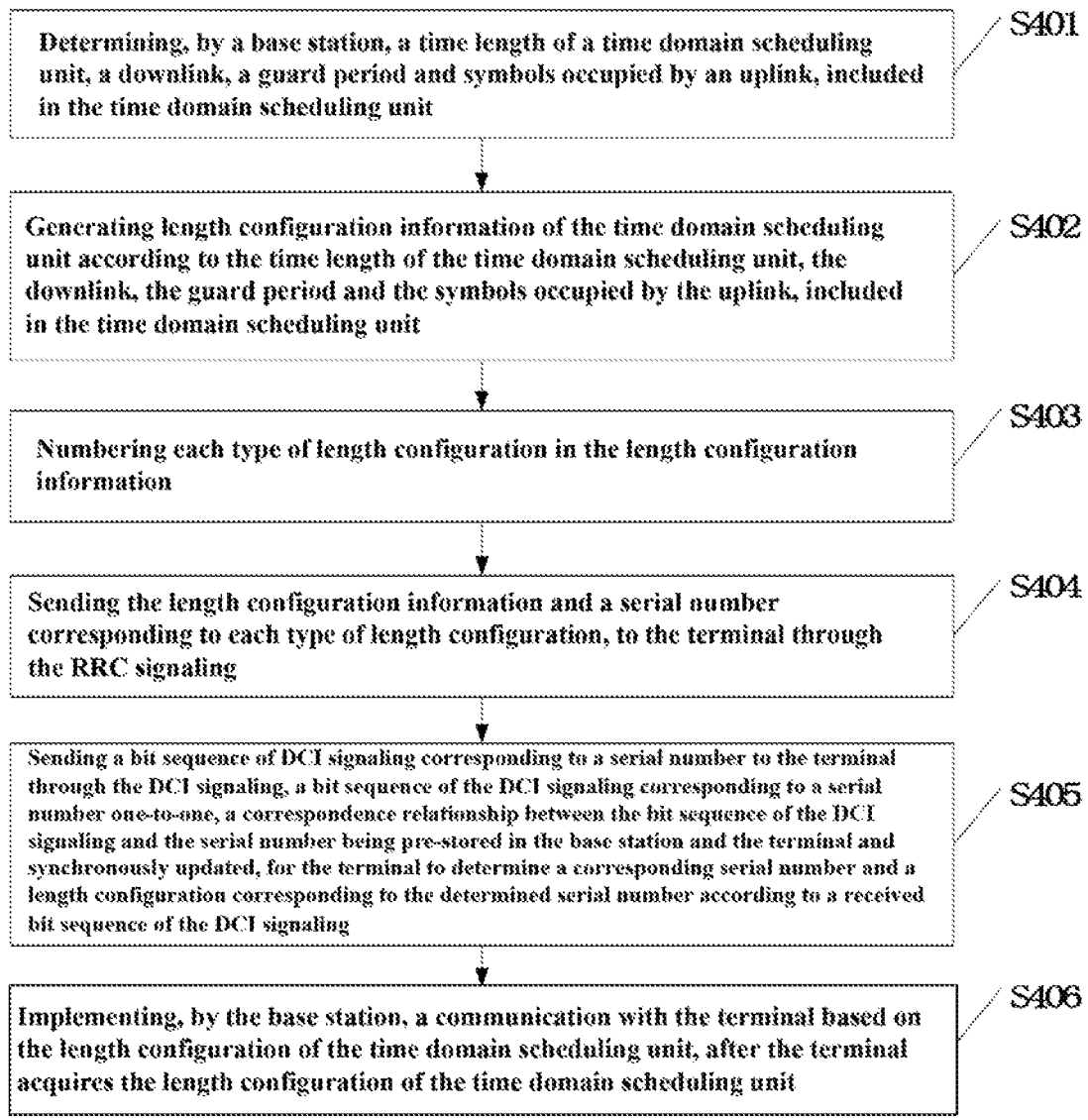
FIG. 4 is a flowchart of a fourth embodiment of the communication method in accordance with the present disclosure.

Referring to FIG. 4, which is a flowchart of a fourth embodiment of the communication method in accordance with the present disclosure. In the fourth embodiment, the RRC signaling and the DCI signaling are required to be used at the same time. The method includes the following steps:

S401, the base station determines a time length of a time domain scheduling unit, and a downlink, a guard period and symbols occupied by an uplink, which are included in the time domain scheduling unit.

S402, the base station generates length configuration information of the time domain scheduling unit according to the determined time length of the time domain scheduling unit, and the downlink, the guard period and the symbols occupied by the uplink, which are included in the time domain scheduling unit.

S403, the base station numbers each type of length configuration in the length configuration information.

S404, the base station sends the length configuration information and a serial number corresponding to each type of length configuration, to the terminal through the RRC signaling.

S405, the base station sends a bit sequence of downlink control information signaling corresponding to a serial number to the terminal through the downlink control information signaling. There is a one-to-one correspondence relationship between a bit sequence of the downlink control information signaling and a serial number, a correspondence relationship between the bit sequence of the downlink control information signaling and the serial number is pre-stored in the base station and the terminal and synchronously updated, for the terminal to determine a corresponding serial number and a length configuration corresponding to the determined serial number according to a received bit sequence of the downlink control information signaling.

S406, after the terminal acquires the length configuration of the time domain scheduling unit, the base station implements a communication with the terminal based on the length configuration of the time domain scheduling unit.

Figure 5:
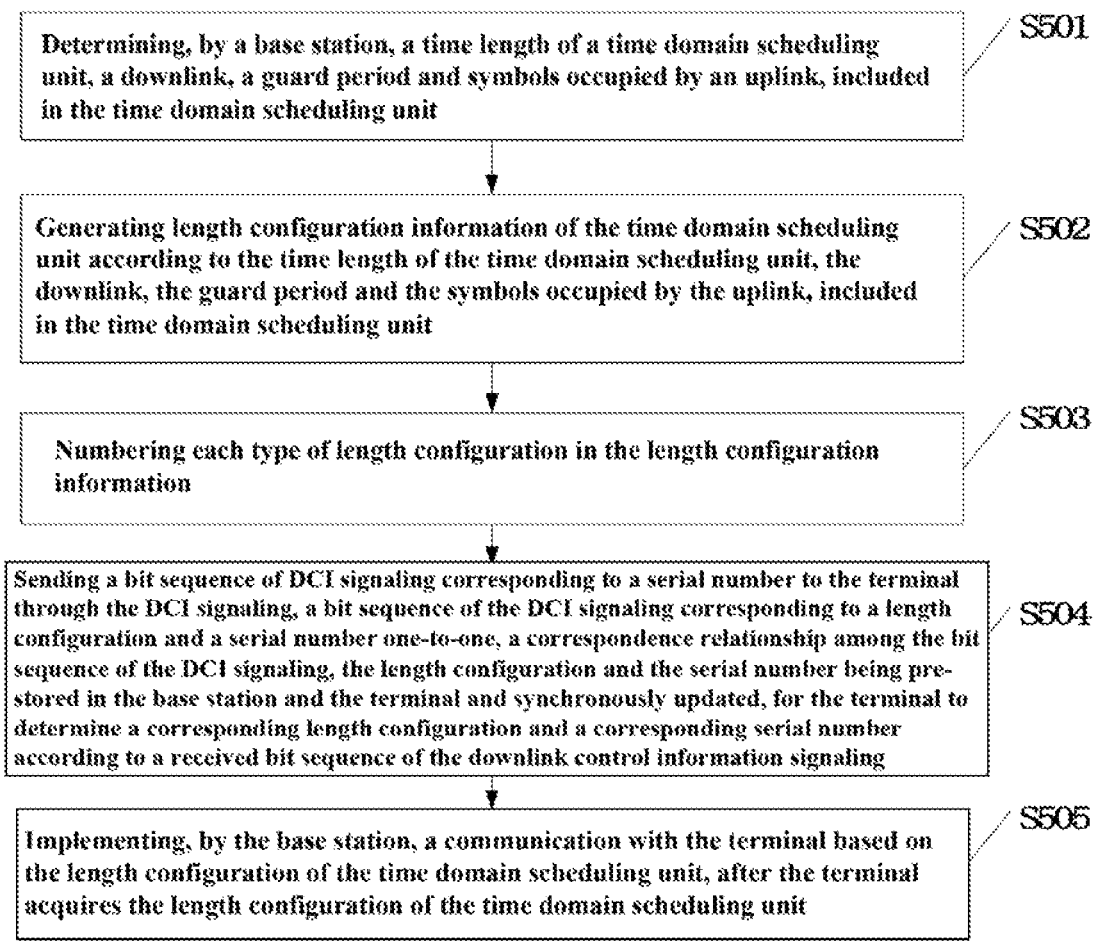
FIG. 5 is a flowchart of a fifth embodiment of the communication method in accordance with the present disclosure.

Referring to FIG. 5, which is a flowchart of a fifth embodiment of the communication method in accordance with the present disclosure. In the fifth embodiment, merely the DCI signaling is used. The method includes the following steps:

S501, the base station determines a time length of a time domain scheduling unit, and a downlink, a guard period and symbols occupied by an uplink, which are included in the time domain scheduling unit.

S502, the base station generates length configuration information of the time domain scheduling unit according to the determined time length of the time domain scheduling unit, and the downlink, the guard period and the symbols occupied by the uplink, which are included in the time domain scheduling unit.

S503, the base station numbers each type of length configuration in the length configuration information.

S504, the base station sends a bit sequence of downlink control information signaling corresponding to a serial number to the terminal through the downlink control information signaling. There is a one-to-one correspondence relationship among a bit sequence of the downlink control information signaling, a length configuration and a serial number, a correspondence relationship among the bit sequence of the downlink control information signaling, the length configuration and the serial number is pre-stored in the base station and the terminal and synchronously updated, for the terminal to determine a corresponding length configuration and a corresponding serial number according to a received bit sequence of the downlink control information signaling.

S505, after the terminal acquires the length configuration of the time domain scheduling unit, the base station implements a communication with the terminal based on the length configuration of the time domain scheduling unit.

Optionally, in the embodiments as shown in FIG. 4 and FIG. 5, under the condition that the time domain scheduling unit is used for transmitting downlink data, a serial number offset value x of the time domain scheduling unit where the downlink data resides, is indicated in the DCI signaling. The downlink data corresponding to a hybrid automatic repeat request (HARQ) feedback sent in an uplink of the time domain scheduling unit. x being an integer larger than or equal to 0, the serial number offset value x of the time domain scheduling unit is used for indicating that a HARQ feedback sent in an uplink of a current time domain scheduling unit corresponds to a HARQ feedback of downlink data sent in a downlink of an x-th time domain scheduling unit prior to the current time domain scheduling unit.

For example, the current time domain scheduling unit is n, when downlink data is sent in n, a HARQ feedback corresponding to the downlink data is sent in a (n+x)-th time domain scheduling unit.

Under the condition that the time domain scheduling unit is used for transmitting the uplink data, a serial number offset value y of the time domain scheduling unit that sends the uplink data, is indicated in the downlink control information signaling. The uplink data corresponds to uplink grant information sent in the downlink control information signaling in the time domain scheduling unit. y is an integer larger than or equal to 0, the serial number offset value y of the time domain scheduling unit is used for indicating that the uplink data corresponding to the uplink grant information sent in the downlink control information signaling in a current time domain scheduling unit, is sent in an uplink of a y-th time domain scheduling unit after the current time domain scheduling unit.

For example, the current time domain scheduling unit is n, when the uplink grant information is sent in n, the uplink data corresponding to the uplink grant information is sent in the (n+y)-th time domain scheduling units.

Figure 6:
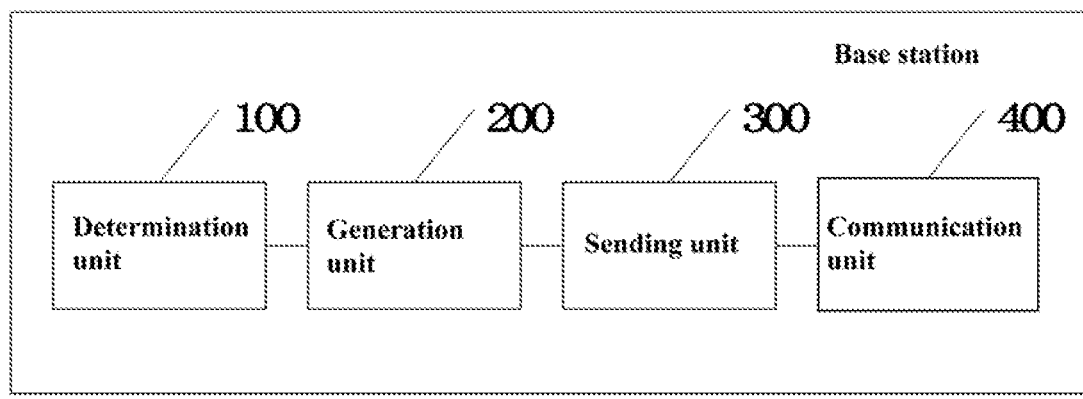
FIG. 6 is a component diagram of a first embodiment of a base station provided by the present disclosure.

Referring to FIG. 6, which is a component diagram of a first embodiment of a base station provided by the present disclosure; in this embodiment, the base station includes:

A determination unit 100 is configured to determine a time length of a time domain scheduling unit, a downlink, a guard period and symbols occupied by an uplink, which are included in the time domain scheduling unit;

A generation unit 200 is configured to generate length configuration information of the time domain scheduling unit according to the determined time length of the time domain scheduling unit, the downlink, the guard period and the symbols occupied by the uplink, which are included in the time domain scheduling unit;

A sending unit 300 is configured to send the length configuration information to a terminal through radio resource control signaling and/or downlink control information signaling, and inform the terminal of a length configuration of the time domain scheduling unit;

A communication unit 400 is configured to implement a communication with the terminal based on the length configuration of the time domain scheduling unit, after the terminal acquires the length configuration of the time domain scheduling unit.

Optionally, the sending unit 300 is specifically configured to:

Send the radio resource control signaling to the terminal;

Configure and carry the time length information of the time domain scheduling unit, symbol information occupied by the downlink, symbol information occupied by the guard period, symbol information occupied by the uplink and sequence information of the downlink, the guard period and the uplink, in the radio resource control signaling.

Optionally, the sending unit 300 is specifically configured to:

Send the radio resource control signaling to the terminal;

Under the condition that the time domain scheduling unit is used for transmitting downlink data, configure and carry indication signaling for the time domain scheduling unit to transmit the downlink data, the time length information of the time domain scheduling unit, the symbol information occupied by the guard period, the symbol information occupied by the uplink and the sequence information of the downlink, the guard period and the uplink, in the radio resource control signaling;

Under the condition that the time domain scheduling unit is used for transmitting uplink data, configure and carry indication signaling for the time domain scheduling unit to transmit the uplink data, the time length information of the time domain scheduling unit, the symbol information occupied by the downlink, the symbol information occupied by the guard period, and the sequence information of the downlink, the guard period and the uplink, in the radio resource control signaling.

Optionally, the sending unit 300 is specifically configured to:

Number each type of length configuration in the length configuration information;

Send the length configuration information and a serial number corresponding to each type of length configuration to the terminal through the radio resource control signaling;

Send a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

Optionally, the sending unit 300 is specifically configured to:

Number each type of length configuration in the length configuration information;

Send a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

Figure 7:
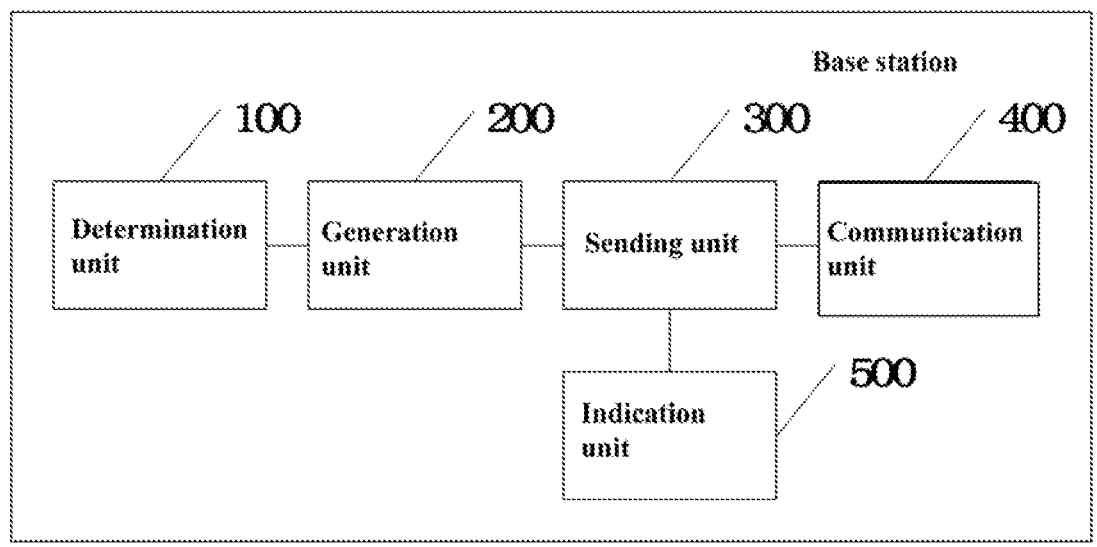
FIG. 7 is a component diagram of a second embodiment of a base station provided by the present disclosure.

Referring to FIG. 7, which is a component diagram of a second embodiment of a base station provided by the present disclosure; in this embodiment, compared with the embodiment shown in FIG. 6, the base station further includes:

An indication unit 500 is configured to, under the condition that the time domain scheduling unit is used for transmitting downlink data, indicate in the downlink control information signaling, a serial number offset value x of the time domain scheduling unit where the downlink data resides, corresponding to a HARQ feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;

Under the condition that the time domain scheduling unit is used for transmitting the uplink data, indicate in the downlink control information signaling, a serial number offset value y of the time domain scheduling unit that sends the uplink data, corresponding to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

Figure 8:
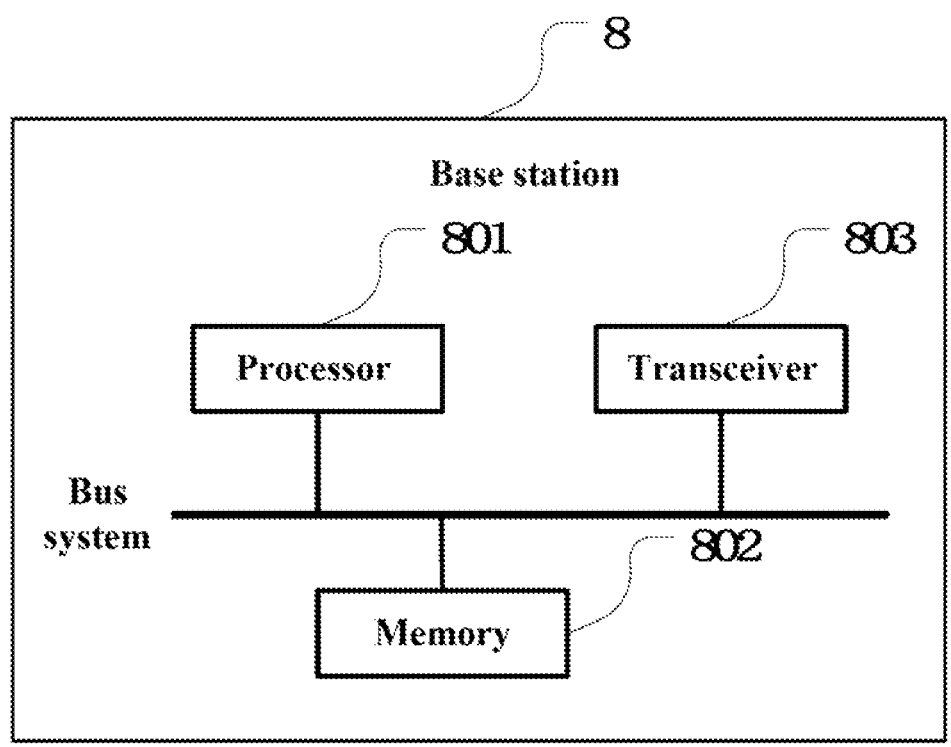
FIG. 8 is a structural diagram of an embodiment of the base station provided by the present disclosure.

FIG. 8 is a structural diagram of an embodiment of the base station provided by the present disclosure.

Referring to FIG. 8, which is structural diagram of an embodiment of the base station provided by the present disclosure, in an embodiment of the present disclosure, the base station 8 includes a processor 801, a memory 802 and a transceiver 803. The transceiver 803 is used for receiving and transmitting data with external equipment. A number of the processor 801 in the base station 8 can be one or more. In some embodiments of the present disclosure, the processor 801, the memory 802 and the transceiver 803 can be connected through a bus system or other modes. The base station 8 can be used to execute the methods shown in FIG. 1 to FIG. 5.

The memory 802 stores program codes, and the processor 801 can invoke the program codes stored in the memory 802 through a bus system, to execute related functions. For example, each of the units described in FIG. 4 (e.g., the determination unit 100, the generation unit 200, the sending unit 300, the communication unit 400, the indication unit 500, and the like) is program codes stored in the memory 802 and executed by the processor 801, thereby executing functions of each unit to realize the communication method.

Specifically, the processor 801 determines a time length of a time domain scheduling unit, a downlink, a guard period and symbols occupied by an uplink, included in the time domain scheduling unit; generates length configuration information of the time domain scheduling unit according to the determined time length of the time domain scheduling unit, the downlink, the guard period and the symbols occupied by the uplink, included in the time domain scheduling unit; sends the length configuration information to a terminal through radio resource control signaling and/or downlink control information signaling, and informs the terminal of a length configuration of the time domain scheduling unit; and implements a communication with the terminal by the base station based on the length configuration of the time domain scheduling unit, after the terminal acquires the length configuration of the time domain scheduling unit.

In a further embodiment, the processor 801 sends the length configuration information to the terminal through the radio resource control signaling and/or the downlink control information signaling, and informs the terminal of the length configuration of the time domain scheduling unit, includes Sends the radio resource control signaling to the terminal; and configures and carries the time length information of the time domain scheduling unit, symbol information occupied by the downlink, symbol information occupied by the guard period, symbol information occupied by the uplink and sequence information of the downlink, the guard period and the uplink, in the radio resource control signaling.

In a further embodiment, the processor 801 sends the length configuration information to the terminal through the radio resource control signaling and/or the downlink control information signaling, and informs the terminal of the length configuration of the time domain scheduling unit, includes:

Sends the radio resource control signaling to the terminal; under the condition that the time domain scheduling unit is used for transmitting downlink data, configures and carries indication signaling for the time domain scheduling unit to transmit the downlink data, the time length information of the time domain scheduling unit, the symbol information occupied by the guard period, the symbol information occupied by the uplink and sequence information of the downlink, the guard period and the uplink, in the radio resource control signaling; or under the condition that the time domain scheduling unit is used for transmitting uplink data, configures and carries indication signaling for the time domain scheduling unit to transmit the uplink data, the time length information of the time domain scheduling unit, the symbol information occupied by the downlink, the symbol information occupied by the guard period, and the sequence information of the downlink, the guard period and the uplink, in the radio resource control signaling.

In a further embodiment, the processor 801 sends the length configuration information to the terminal through the radio resource control signaling and/or the downlink control information signaling, and informs the terminal of the length configuration of the time domain scheduling unit, includes:

The processor 801 numbers each type of length configuration in the length configuration information;

Sends the length configuration information and a serial number corresponding to each type of length configuration to the terminal through the radio resource control signaling;

Sends a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

In a further embodiment, the processor 801 sends the length configuration information to the terminal through the radio resource control signaling and/or the downlink control information signaling, and informs the terminal of the length configuration of the time domain scheduling unit, includes:

The processor 801 numbers each type of length configuration in the length configuration information;

sends a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

In a further embodiment, under the condition that the time domain scheduling unit is used for transmitting downlink data, the processor 801 indicates in the DCI signaling, a serial number offset value x of the time domain scheduling unit where the downlink data resides. The downlink data corresponding to a hybrid automatic repeat request (HARQ) feedback sent in an uplink of the time domain scheduling unit. x being an integer larger than or equal to 0, the serial number offset value x of the time domain scheduling unit is used for indicating that a HARQ feedback sent in an uplink of a current time domain scheduling unit corresponds to a HARQ feedback of downlink data sent in a downlink of an x-th time domain scheduling unit prior to the current time domain scheduling unit.

Under the condition that the time domain scheduling unit is used for transmitting the uplink data, the processor 801 indicates a serial number offset value y of the time domain scheduling unit that sends the uplink data, in the DCI signaling. The uplink data corresponds to uplink grant information sent in the downlink control information signaling in the time domain scheduling unit. y is an integer larger than or equal to 0, the serial number offset value y of the time domain scheduling unit is used for indicating that the uplink data corresponding to the uplink grant information sent in the downlink control information signaling in a current time domain scheduling unit, is sent in an uplink of a y-th time domain scheduling unit after the current time domain scheduling unit.

According to the descriptions of the above embodiments, the present disclosure has the following advantages:

After the base station determines the time length of the time domain scheduling unit and the downlink, the guard period and the symbols occupied by the uplink included in the time domain scheduling unit, the base station can generate the length configuration information of the time domain scheduling unit; and sends them to the terminal through the radio resource control signaling and/or the downlink control information signaling; and then implements a communication with the terminal based on the length configuration of the time domain scheduling unit. Flexible scheduling of time domain resources can be realized through a new time domain scheduling unit, and the processing time delay of the system can be reduced. Various embodiments in the specification are described in a progressive manner, emphasis of each embodiment describes differences with other embodiments, the same or similar descriptions of the various embodiments of the present disclosure can be referred to each other. For the device disclosed by the embodiments, as it corresponds to the method disclosed by the embodiment, thus, the descriptions are simple, and relevant descriptions can be referred to the method.

In several embodiments provided by the present disclosure, it should be understood that, the devices and the methods disclosed by the present disclosure can be realized in other manners. The devices in the embodiments described above are merely illustrative, for example, the division of the units are merely divided according to logic function, and in actual implementation, another division mode can be used, for example, multiple units or components can be combined or can be integrated into another system, or some features or functions can be ignored or not executed. For another aspect, the displayed or discussed mutual coupling or direct coupling or communication connection can be through some interfaces, an indirect coupling or communication connection of the devices or the units can be electrical or other forms.

The units illustrated as separate parts may or may not be physically separated, the component displayed as a unit may be or may not be a physical unit, or may be distributed to a same location or distributed to a plurality of network units. According to actual requirements, some or all of the units can be selected to achieve the purpose of the scheme of the embodiment.

In addition, the function units in various embodiments of the present disclosure can be integrated in a processing unit or can be a signal physical unit, and the two or more units can be integrated in one unit. The integrated unit can be implemented in a form of hardware, and also can be implemented in a form of software function units.

When the integrated unit is implemented in the form of software function units and sold or used as an independent product, the integrated unit can be stored in a computer readable storage medium. Based on such understanding, the technical solution of the present disclosure essentially or partially that makes contributions to the prior art, or all or part of the technical scheme can be embodied in the form of a software product, the computer software product is stored in a storage medium, and includes a plurality of instructions for enabling one computer device (which can be a personal computer, a server or network equipment and the like) to execute all or part of the steps of the method according to the embodiments of the present disclosure. The storage medium includes a magnetic disk, an optical disk, a Read-Only memory (ROM), or a Random Access Memory (RAM) and the like.

As described above, the above embodiments are merely used to illustrate the technical solutions of the present disclosure and are not limited thereto; although the present disclosure has been described in detail with reference to the foregoing embodiments, it should be understood by those of ordinary skill in the art that, the technical scheme described in the embodiments can still be modified, or equivalently replacing some or all of the technical features; and the modification or replacement does not make the essence of the corresponding technical scheme depart from the scope of the technical solutions of the embodiments of the present disclosure.

What is claimed is:

1. A communication method, comprising:
   determining, by a base station, a time length of a time domain scheduling unit, and determining which symbols are occupied by a downlink, a guard period and an uplink in the time domain scheduling unit, wherein the time length of the time domain scheduling unit is $2^n*5^m$ ms, the n and m in $2^n*5^m$ being integers, when the time domain scheduling unit comprises one subframe and the subframe comprises 14 symbols:
when information transmitted by the time domain scheduling unit merely comprises uplink information, the number of the symbols occupied by the downlink is set to be zero, the number of the symbols occupied by the guard period is set to be zero, and the number of the symbols occupied by the uplink is set to be 14;
when the information transmitted by the time domain scheduling unit comprises Downlink Control Information (DCI) and/or downlink reference information of a Physical Downlink Control Channel (PDCCH), and uplink data and/or Uplink Control Information (UCI) and/or a Sounding Reference Signal (SRS) and/or a Random Access Preamble (RA preamble), the number of the symbols occupied by the downlink is set to be 1 or 2 or 3, the number of the symbols occupied by the guard period is set to be 1 or 2, and remaining symbols are set to be the length of the uplink;
when the information transmitted by the time domain scheduling unit includes DCI of the PDCCH and/or downlink data of a Physical Downlink Shared Channel (PDSCH) and/or Downlink Reference Information (DRI), and the uplink data and/or the UCI and/or the SRS and/or the RA preamble, the number of the symbols occupied by the downlink is set to be 12, the number of the symbols occupied by the guard period is set to be 1, and the remaining symbols are set to be the length of the uplink;
when the information transmitted by the time domain scheduling unit includes DCI of an enhanced Physical Downlink Control Channel (ePDCCH) and/or downlink data and/or DRI of a PDSCH, and uplink data and/or the UCI and/or the SRS and/or the RA preamble, the number of the symbols occupied by the downlink is set to be 7, the number of the symbols occupied by the guard period is set to be 1 or 2, and the remaining symbols are set to be the length of the uplink;
when the information transmitted by the time domain scheduling unit merely comprises the downlink information, the number of the symbols occupied by the downlink is set to be 14, the number of the symbols occupied by the guard period is set to be zero, and the number of the symbols occupied by the uplink is set to be zero;
generating length configuration information of the time domain scheduling unit according to the time length of the time domain scheduling unit, and the symbols occupied by the downlink, the guard period and the symbols by the uplink comprised in the time domain scheduling unit;
sending the length configuration information to a terminal through radio resource control signaling and/or downlink control information signaling, and informing the terminal of a length configuration of the time domain scheduling unit;
implementing, by the base station, a communication with the terminal based on the length configuration of the time domain scheduling unit, after the terminal acquires the length configuration of the time domain scheduling unit.

2. The communication method of claim 1, wherein
when the information transmitted by the time domain scheduling unit merely comprises uplink information, all of the uplink is used for transmitting the uplink information, or a small period of time at a head portion or a tail portion of the uplink is used for implementing a Listen Before Talk (LBT) detection;
when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises uplink resource scheduling signaling, the downlink reference information comprises a Common Reference Signal (CRS), a Channel Status Information Reference Signal (CSI-RS), a Demodulation Reference Signal (DM-RS), or a Discovery Reference Signal (DRS), the uplink control information is a Channel Quality Indicator (CQI) feedback and/or an HARQ feedback;
when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises downlink resource scheduling signaling, or comprises the downlink resource scheduling signaling and uplink resource scheduling signaling, when the number of the symbols occupied by the downlink is 3, 6, 9, 10, 11 or 12, a structure of downlink data transmission of LTE is multiplexed, the DRS comprised a CRS, a CSI-RS, a DM-RS, or a DRS, the UCI is a CQI feedback and/or an HARQ feedback; and
when the information transmitted by the time domain scheduling unit merely comprises the downlink information, all of the downlink is used for transmitting the downlink information, or a small period of time at the head portion or the tail portion of the downlink is used for implementing the LBT detection.

3. The communication method of claim 1, wherein
when the time domain scheduling unit comprises M subframes, M being an integer equal to 2 or more, and each subframe comprises 14 symbols:
when the information transmitted by the time domain scheduling unit merely comprises uplink information, the number of the symbols occupied by the downlink is set to be zero, the number of the symbols occupied by the guard period is set to be zero, and the length occupied by the uplink is M subframes;
when the information transmitted by the time domain scheduling unit comprises DCI of the PDCCH and/ or downlink reference information, and the uplink data and/or the UCI and/or the SRS and/or the RA preamble, the number of symbols of a first subframe occupied by the downlink is set to be 1 or 2 or 3, the number of symbols of the first subframe occupied by the guard period is set to be 1 or 2, and the remaining symbols of the first subframe and the other subframes except the first subframe are set to be the length of the uplink;
when the information transmitted by the time domain scheduling unit comprises DCI of the PDCCH or DCI of an enhanced PDCCH and/or downlink data of PDSCH and/or downlink reference information, and the uplink data and/or the UCI and/or the SRS and/or the RA preamble, the number of the symbols of each subframe occupied by the downlink are set to be 12, the number of the symbols of the last subframe occupied by the guard period is set to be 1, and the remaining symbols of the last subframe are set to be the length of the uplink;

when the information transmitted by the time domain scheduling unit comprises DCI of the enhanced PDCCH and/or downlink data of the PDSCH and/or downlink reference information, and the uplink data and/or the UCI and/or the SRS and/or the RA preamble, the number of symbols of a first subframe occupied by the downlink is set to be 7, the number of symbols of the first subframe occupied by the guard period is set to be 1 or 2, and the remaining symbols of the first subframe and the other subframes except the first subframe are set to be the length of the uplink link;

when the information transmitted by the time domain scheduling unit merely comprises downlink information, a length occupied by the downlink is set to be M subframes, the number of symbols occupied by the guard period is set to be zero, and the number of symbols occupied by the uplink is set to be zero.

4. The communication method of claim 1, wherein sending the length configuration information to the terminal through the radio resource control signaling and/or the downlink control information signaling, and informing the terminal of the length configuration of the time domain scheduling unit, comprises:

numbering each type of length configuration in the length configuration information;

sending the length configuration information and a serial number corresponding to each type of length configuration to the terminal through the radio resource control signaling;

sending a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

5. The communication method of claim 1, wherein sending the length configuration information to the terminal through the radio resource control signaling and/or the downlink control information signaling, and informing the terminal of the length configuration of the time domain scheduling unit, comprises:

numbering each type of length configuration in the length configuration information;

sending a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

6. The communication method of claim 4, further comprising:

when the time domain scheduling unit is used for transmitting downlink data, indicating in the downlink control information signaling, a serial number offset value x of the time domain scheduling unit where the downlink data resides, corresponding to a hybrid automatic repeat request (HARQ) feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;

when the time domain scheduling unit is used for transmitting the uplink data, indicating in the downlink control information signaling, a serial number offset value y of the time domain scheduling unit that sends the uplink data, which corresponds to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

7. A base station, comprising:

a processor; and a memory storing a plurality of instructions, which when executed by the processor, causes the processor to:

determine a time length of a time domain scheduling unit, and determine which symbols are occupied by a downlink, a guard period and an uplink in the time domain scheduling unit, wherein the time length of the time domain scheduling unit is $2^n*5^m$ ms, the n and m in $2^n*5^m$ being integers, when the time domain scheduling unit comprises one subframe and the subframe comprises 14 symbols:

when information transmitted by the time domain scheduling unit merely comprises uplink information, the number of the symbols occupied by the downlink is set to be zero, the number of the symbols occupied by the guard period is set to be zero, and the number of the symbols occupied by the uplink is set to be 14;

when the information transmitted by the time domain scheduling unit comprises Downlink Control Information (DCI) and/or downlink reference information of a Physical Downlink Control Channel (PDCCH), and uplink data and/or Uplink Control Information (UCI) and/or a Sounding Reference Signal (SRS) and/or a Random Access Preamble (RA preamble), the number of the symbols occupied by the downlink is set to be 1 or 2 or 3, the number of the symbols occupied by the guard period is set to be 1 or 2, and remaining symbols are set to be the length of the uplink;

when the information transmitted by the time domain scheduling unit includes DCI of the PDCCH and/or downlink data of a Physical Downlink Shared Channel (PDSCH) and/or Downlink Reference Information (DRI), and the uplink data and/or the UCI and/or the SRS and/or the RA preamble, the number of the symbols occupied by the downlink is set to be 12, the number of the symbols occupied by the guard period is set to be 1, and the remaining symbols are set to be the length of the uplink;

when the information transmitted by the time domain scheduling unit includes DCI of an enhanced Physical Downlink Control Channel (ePDCCH) and/or downlink data and/or DRI of a PDSCH, and uplink data and/or the UCI and/or the SRS and/or the RA preamble, the number of the symbols occupied by the downlink is set to be 7, the number of the symbols occupied by the guard period is set to be 1 or 2, and the remaining symbols are set to be the length of the uplink;

when the information transmitted by the time domain scheduling unit merely comprises the downlink information, the number of the symbols occupied by the downlink is set to be 14, the number of the symbols occupied by the guard period is set to be zero, and the number of the symbols occupied by the uplink is set to be zero;

generate length configuration information of the time domain scheduling unit according to the time length of the time domain scheduling unit, and the symbols occupied by the downlink, the guard period and the symbols the uplink comprised in the time domain scheduling unit;

send the length configuration information to a terminal through radio resource control signaling and/or downlink control information signaling, and inform the terminal of a length configuration of the time domain scheduling unit;

implement a communication with the terminal by the base station based on the length configuration of the time domain scheduling unit, after the terminal acquires the length configuration of the time domain scheduling unit.

8. The base station of claim 7, wherein:

when the information transmitted by the time domain scheduling unit merely comprises uplink information, all of the uplink is used for transmitting the uplink information, or a small period of time at a head portion or a tail portion of the uplink is used for implementing a Listen Before Talk (LBT) detection;

when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises uplink resource scheduling signaling, the downlink reference information comprises a Common Reference Signal (CRS), a Channel Status Information Reference Signal (CSI-RS), a Demodulation Reference Signal (DM-RS), or a Discovery Reference Signal (DRS), the uplink control information is a Channel Quality Indicator (CQI) feedback and/or an HARQ feedback;

when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises downlink resource scheduling signaling, or comprises the downlink resource scheduling signaling and uplink resource scheduling signaling, when the number of the symbols occupied by the downlink is 3, 6, 9, 10, 11 or 12, a structure of downlink data transmission of LTE is multiplexed, the DRS comprised a CRS, a CSI-RS, a DM-RS, or a DRS, the UCI is a CQI feedback and/or an HARQ feedback; and when the information transmitted by the time domain scheduling unit merely comprises the downlink information, all of the downlink is used for transmitting the downlink information, or a small period of time at the head portion or the tail portion of the downlink is used for implementing the LBT detection.

9. The base station of claim 7, wherein when the time domain scheduling unit comprises M subframes, M being an integer equal to 2 or more, and each subframe comprises 14 symbols:

when the information transmitted by the time domain scheduling unit merely comprises uplink information, the number of the symbols occupied by the downlink is set to be zero, the number of the symbols occupied by the guard period is set to be zero, and the length occupied by the uplink is M subframes;

when the information transmitted by the time domain scheduling unit comprises DCI of the PDCCH and/or downlink reference information, and the uplink data and/or the UCI and/or the SRS and/or the RA preamble, the number of symbols of a first subframe occupied by the downlink is set to be 1 or 2 or 3, the number of symbols of the first subframe occupied by the guard period is set to be 1 or 2, and the remaining symbols of the first subframe and the other subframes except the first subframe are set to be the length of the uplink;

when the information transmitted by the time domain scheduling unit comprises DCI of the PDCCH or DCI of an enhanced PDCCH and/or downlink data of PDSCH and/or downlink reference information, and the uplink data and/or the UCI and/or the SRS and/or the RA preamble, the number of the symbols of each subframe occupied by the downlink are set to be 12, the number of the symbols of the last subframe occupied by the guard period is set to be 1, and the remaining symbols of the last subframe are set to be the length of the uplink;

when the information transmitted by the time domain scheduling unit comprises DCI of the enhanced PDCCH and/or downlink data of the PDSCH and/or downlink reference information, and the uplink data and/or the UCI and/or the SRS and/or the RA preamble, the number of symbols of a first subframe occupied by the downlink is set to be 7, a number of symbols of the first subframe occupied by the guard period is set to be 1 or 2, and the remaining symbols of the first subframe and the other subframes except the first subframe are set to be the length of the uplink link;

when the information transmitted by the time domain scheduling unit merely comprises downlink information, a length occupied by the downlink is set to be M subframes, the number of symbols occupied by the guard period is set to be zero, and the number of symbols occupied by the uplink is set to be zero.

10. The base station of claim 7, wherein the processor further:

numbers each type of length configuration in the length configuration information;
sends the length configuration information and a serial number corresponding to each type of length configuration to the terminal through the radio resource control signaling;
sends a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

11. The base station of claim 7, wherein the processor further:
numbers each type of length configuration in the length configuration information;
sends a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

12. The base station of claim 10, wherein the processor further:
when the time domain scheduling unit is used for transmitting downlink data, indicates in the downlink control information signaling, a serial number offset value x of the time domain scheduling unit where the downlink data resides, corresponding to a HARQ feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;
when the time domain scheduling unit is used for transmitting the uplink data, indicates in the downlink control information signaling, a serial number offset value y of the time domain scheduling unit that sends the uplink data, corresponding to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

13. The base station of claim 11, wherein the processor further:
when the time domain scheduling unit is used for transmitting downlink data, indicates in the downlink control information signaling, a serial number offset value x of the time domain scheduling unit where the downlink data resides, corresponding to a HARQ feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;
when the time domain scheduling unit is used for transmitting the uplink data, indicates in the downlink control information signaling, a serial number offset value y of the time domain scheduling unit that sends the uplink data, corresponding to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

14. The communication method of claim 5, further comprising:
when the time domain scheduling unit is used for transmitting downlink data, indicating in the downlink control information signaling, a serial number offset value x of the time domain scheduling unit where the downlink data resides, corresponding to a hybrid automatic repeat request (HARQ) feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;
when the time domain scheduling unit is used for transmitting the uplink data, indicating in the downlink control information signaling, a serial number offset value y of the time domain scheduling unit that sends the uplink data, which corresponds to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

15. A non-transitory storage medium having stored thereon instructions that, when executed by a processor of a base station, causes the processor of the base station to perform a communication method, the communication method comprising:
determining, by a base station, a time length of a time domain scheduling unit, and determining which symbols are occupied by a downlink, a guard period and an uplink in the time domain scheduling unit, wherein the time length of the time domain scheduling unit is $2^n*5^m$ ms, the n and m in $2^n*5^m$ being integers, when the time domain scheduling unit comprises one subframe and the subframe comprises 14 symbols:
  when information transmitted by the time domain scheduling unit merely comprises uplink information, the number of the symbols occupied by the downlink is set to be zero, the number of the symbols occupied by the guard period is set to be zero, and the number of the symbols occupied by the uplink is set to be 14;
  when the information transmitted by the time domain scheduling unit comprises Downlink Control Information (DCI) and/or downlink reference information of a Physical Downlink Control Channel (PDCCH), and uplink data and/or Uplink Control Information (UCI) and/or a Sounding Reference Signal (SRS) and/or a Random Access Preamble (RA preamble), the number of the symbols occupied by the downlink is set to be 1 or 2 or 3, the number of the symbols occupied by the guard period is set to be 1 or 2, and remaining symbols are set to be the length of the uplink;
  when the information transmitted by the time domain scheduling unit includes DCI of the PDCCH and/or downlink data of a Physical Downlink Shared Channel (PDSCH) and/or Downlink Reference Information (DRI), and the uplink data and/or the UCI and/or the SRS and/or the RA preamble, the number of the symbols occupied by the downlink is set to be 12, the number of the symbols occupied by the guard period is set to be 1, and the remaining symbols are set to be the length of the uplink;
  when the information transmitted by the time domain scheduling unit includes DCI of an enhanced Physical Downlink Control Channel (ePDCCH) and/or downlink data and/or DRI of a PDSCH, and uplink data and/or the UCI and/or the SRS and/or the RA preamble, the number of the symbols occupied by the downlink is set to be 7, the number of the symbols occupied by the guard period is set to be 1 or 2, and the remaining symbols are set to be the length of the uplink;
  when the information transmitted by the time domain scheduling unit merely comprises the downlink information, the number of the symbols occupied by the downlink is set to be 14, the number of the symbols occupied by the guard period is set to be zero, and the number of the symbols occupied by the uplink is set to be zero;
generating length configuration information of the time domain scheduling unit according to the time length of the time domain scheduling unit, and the symbols occupied by the downlink, the guard period and the symbols the uplink comprised in the time domain scheduling unit;
sending the length configuration information to a terminal through radio resource control signaling and/or downlink control information signaling, and informing the terminal of a length configuration of the time domain scheduling unit;
implementing, by the base station, a communication with the terminal based on the length configuration of the time domain scheduling unit, after the terminal acquires the length configuration of the time domain scheduling unit.

16. The non-transitory storage medium according to claim 15, wherein
  when the information transmitted by the time domain scheduling unit merely comprises uplink information, all of the uplink is used for transmitting the uplink information, or a small period of time at a head portion or a tail portion of the uplink is used for implementing a Listen Before Talk (LBT) detection;
  when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises uplink resource scheduling signaling, the downlink reference information comprises a Common Reference Signal (CRS), a Channel Status Information Reference Signal (CSI-RS), a Demodulation Reference Signal (DM-RS), or a Discovery Reference Signal (DRS), the uplink control information is a Channel Quality Indicator (CQI) feedback and/or an HARQ feedback;
  when the information transmitted by the time domain scheduling unit comprises DCI of the PDCCH and/or downlink data of a Physical Downlink Shared Channel (PDSCH) and/or Downlink Reference Information (DRI), and the uplink data and/or the UCI and/or the SRS and/or the RA preamble, the DCI comprises downlink resource scheduling signaling, or comprises the downlink resource scheduling signaling and uplink resource scheduling signaling, when the number of the symbols occupied by the downlink is 3, 6, 9, 10, 11 or 12, a structure of downlink data transmission of LTE is multiplexed, the DRS comprised a CRS, a CSI-RS, a DM-RS, or a DRS, the UCI is a CQI feedback and/or an HARQ feedback; and
  when the information transmitted by the time domain scheduling unit merely comprises the downlink information, all of the downlink is used for transmitting the downlink information, or a small period of time at the head portion or the tail portion of the downlink is used for implementing the LBT detection.

17. The non-transitory storage medium according to claim 15, wherein
  when the time domain scheduling unit comprises M subframes, M being an integer equal to 2 or more, and each subframe comprises 14 symbols:
    when the information transmitted by the time domain scheduling unit merely comprises uplink information, the number of the symbols occupied by the downlink is set to be zero, the number of the symbols occupied by the guard period is set to be zero, and the length occupied by the uplink is M subframes;
    when the information transmitted by the time domain scheduling unit comprises DCI of the PDCCH and/or downlink reference information, and the uplink data and/or the UCI and/or the SRS and/or the RA preamble, the number of symbols of a first subframe occupied by the downlink is set to be 1 or 2 or 3, the number of symbols of the first subframe occupied by the guard period is set to be 1 or 2, and the remaining symbols of the first subframe and the other subframes except the first subframe are set to be the length of the uplink;

when the information transmitted by the time domain scheduling unit comprises DCI of the PDCCH or DCI of an enhanced PDCCH and/or downlink data of PDSCH and/or downlink reference information, and the uplink data and/or the UCI and/or the SRS and/or the RA preamble, the number of the symbols of each subframe occupied by the downlink are set to be 12, the number of the symbols of the last subframe occupied by the guard period is set to be 1, and the remaining symbols of the last subframe are set to be the length of the uplink;

when the information transmitted by the time domain scheduling unit comprises DCI of the enhanced PDCCH and/or downlink data of the PDSCH and/or downlink reference information, and the uplink data and/or the UCI and/or the SRS and/or the RA preamble, the number of symbols of a first subframe occupied by the downlink is set to be 7, the number of symbols of the first subframe occupied by the guard period is set to be 1 or 2, and the remaining symbols of the first subframe and the other subframes except the first subframe are set to be the length of the uplink link;

when the information transmitted by the time domain scheduling unit merely comprises downlink information, a length occupied by the downlink is set to be M subframes, the number of symbols occupied by the guard period is set to be zero, and the number of symbols occupied by the uplink is set to be zero.

18. The non-transitory storage medium according to claim 15, wherein sending the length configuration information to the terminal through the radio resource control signaling and/or the downlink control information signaling, and informing the terminal of the length configuration of the time domain scheduling unit, comprises:

numbering each type of length configuration in the length configuration information;

sending the length configuration information and a serial number corresponding to each type of length configuration to the terminal through the radio resource control signaling;

sending a bit sequence of downlink control information signaling corresponding to a serial number to the terminal through the downlink control information signaling, a bit sequence of the downlink control information signaling corresponding to a serial number one-to-one, a correspondence relationship between the bit sequence of the downlink control information signaling and the serial number being pre-stored in the base station and the terminal and synchronously updated, for the terminal to determine a corresponding serial number and a length configuration corresponding to the determined serial number according to a received bit sequence of the downlink control information signaling.

19. The non-transitory storage medium according to claim 15, wherein sending the length configuration information to the terminal through the radio resource control signaling and/or the downlink control information signaling, and informing the terminal of the length configuration of the time domain scheduling unit, comprises:

numbering each type of length configuration in the length configuration information;

sending a bit sequence of downlink control information signaling corresponding to a serial number to the terminal through the downlink control information signaling, a bit sequence of the downlink control information signaling corresponding to a length configuration and a serial number one-to-one, a correspondence relationship among the bit sequence of the downlink control information signaling, the length configuration and the serial number being pre-stored in the base station and the terminal and synchronously updated, for the terminal to determine a corresponding length configuration and a corresponding serial number according to a received bit sequence of the downlink control information signaling.

20. The non-transitory storage medium according to claim 15, wherein the communication method further comprises:

when the time domain scheduling unit is used for transmitting downlink data, indicating in the downlink control information signaling, a serial number offset value x of the time domain scheduling unit where the downlink data resides, corresponding to a hybrid automatic repeat request (HARQ) feedback sent in an uplink of the time domain scheduling unit, x being an integer larger than or equal to 0, the serial number offset value x of the time domain scheduling unit indicating that a HARQ feedback sent in an uplink of a current time domain scheduling unit corresponds to a HARQ feedback of downlink data sent in a downlink of an x-th time domain scheduling unit prior to the current time domain scheduling unit;

when the time domain scheduling unit is used for transmitting the uplink data, indicating in the downlink control information signaling, a serial number offset value y of the time domain scheduling unit that sends the uplink data, which corresponds to uplink grant information sent in the downlink control information signaling in the time domain scheduling unit, y being an integer larger than or equal to 0, the serial number offset value y of the time domain scheduling unit indicating that the uplink data corresponding to the uplink grant information sent in the downlink control information signaling in a current time domain scheduling unit, is sent in an uplink of a y-th time domain scheduling unit after the current time domain scheduling unit.

* * * * *